Jan. 12, 1943.  A. G. BROWN ET AL  2,308,044
MULTIPLE WEIGHING SCALE
Filed Feb. 7, 1941  4 Sheets-Sheet 2
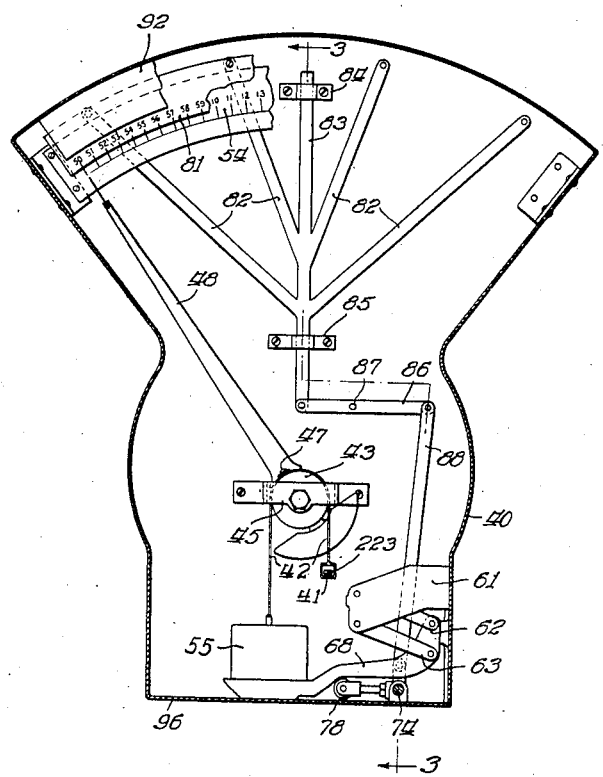
Fig. 2
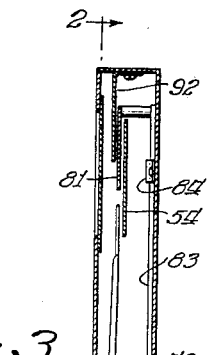
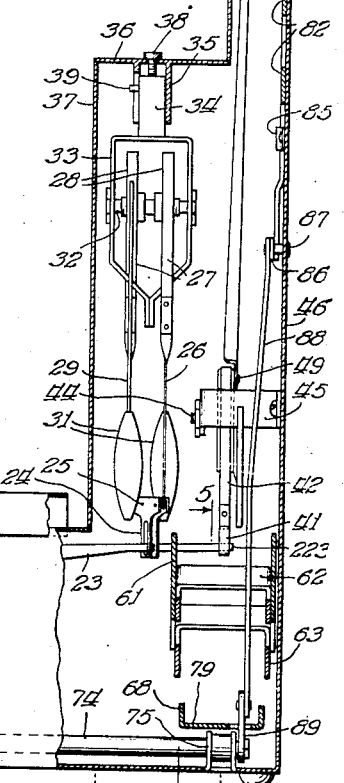
Fig. 3
Inventors:
Andrew G. Brown
Felix Jansey
By: Walter M. Fuller
Atty.

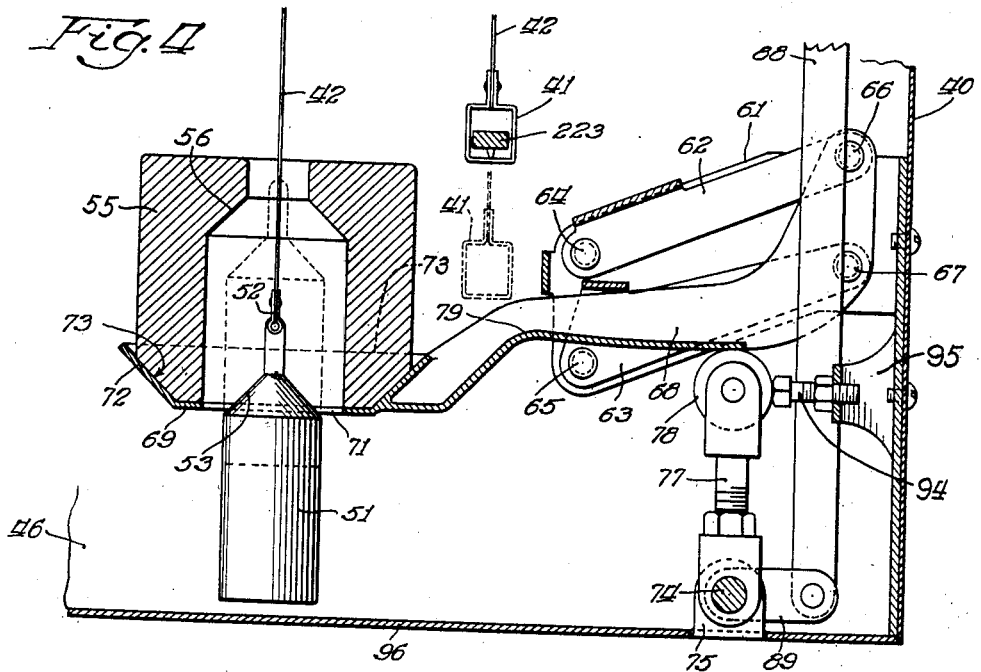
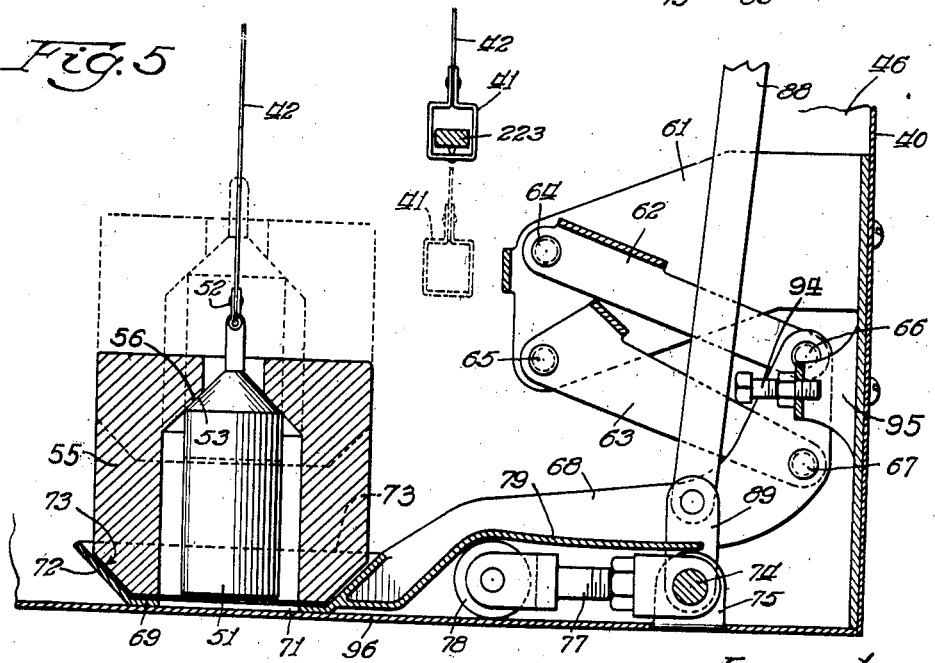

Jan. 12, 1943.   A. G. BROWN ET AL   2,308,044
MULTIPLE WEIGHING SCALE
Filed Feb. 7, 1941   4 Sheets-Sheet 4
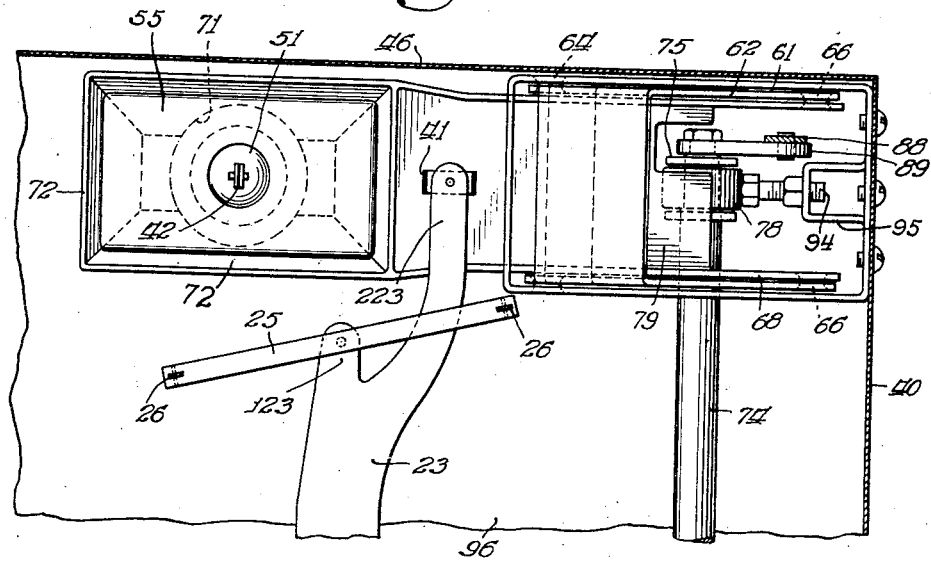
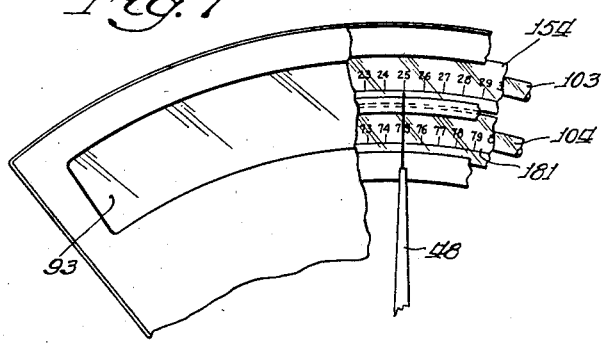
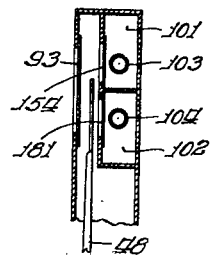
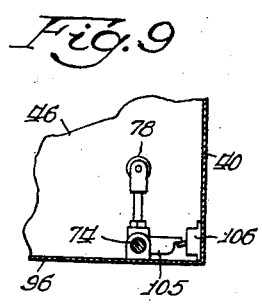
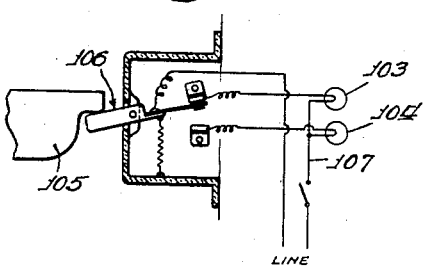
Inventors:
Andrew G. Brown
Felix Jansey
By: Walter M. Fuller Patented Jan. 12, 1943

2,308,044

UNITED STATES PATENT OFFICE 2,308,044

MULTIPLE WEIGHING SCALE

Andrew G. Brown, Chicago, and Felix Jansey, Riverside, Ill.; said Brown assignor to Triner Scale & Manufacturing Company, Chicago, Ill., a corporation of Illinois Application February 7, 1941, Serial No. 377,806

1 Claim. (Cl. 265—48)

The instant invention pertains to certain features of betterment and advantage in weighing-scales and it relates more particularly, but not necessarily exclusively, to scales having a plurality of indicating-charts and of different weighing-capacities under diverse conditions of service.

In one embodiment of the invention, the weighing-scale has a compensating-weight which counterbalances the operating or movable elements of the appliance when no load is on the platform, an eccentric compound-pendulum device balancing whatever load is placed on the scale.

When, however, the capacity of the scale is to be augmented, as, for example, when the scale is arranged to weigh up to 50 pounds and it is desired to enlarge or increase its capacity so that it will weigh from 50 pounds to 100 pounds, a supplemental counterbalancing-weight is used in addition to the original counterbalancing-weight and a corresponding different chart is employed to replace the one used with loads up to 50 pounds.

One object of the invention is to provide a scale of this general type or character in which the specified second counterbalancing-weight is around and added to, or carried by, the first counterbalancing-weight, whereby to effect a pull on the parts of the mechanism symmetrical to that produced by such first weight alone.

A further aim of the invention is to supply an appliance of this character in which only the corresponding single chart functions at a time.

An added purpose of the invention is to furnish a scale of this generic nature in which, when the second weight is added to the first weight by manually-operated means, the compound-pendulum mechanism, which balances a light load when the single weight only is operative, is also capable of balancing the excess of a heavier load above the light-load limit, when the two weights act conjointly.

In general, an outstanding and paramount goal of the invention is to provide a weighing-scale having the above-noted and other valuable structural and functional characteristics which is comparatively simple in construction, which is accurate in operation, which is easily operated, which, during ordinary service, is unlikely to become damaged or injured, and which can be produced and sold to the public at a wholly reasonable cost.

To enable those skilled in this art to understand the present preferred embodiments of the invention, such have been illustrated in the accompanying drawings forming a part of this specification and to which reference should be had in connection with the following detailed description, and, for simplicity, like reference numerals have been employed, throughout the several views, to designate the same mechanical parts.

In these drawings:

Figure 2 is a similar vertical section on line 2—2 of Figure 3;

Figure 3 is a partial, longitudinal, vertical section through the scale on line 3—3 of Figure 2, the platform portion of the scale being depicted in elevation;

Figures 4 and 5 are enlarged views, partly in section, of the counterweight transfer mechanism, illustrated in the lower portion of Figure 2;

Figure 6 is a plan view of the mechanism presented in Figure 4; and

Figures 7, 8, 9 and 10 show details of a modified chart construction and its operating means.

Figure 1:
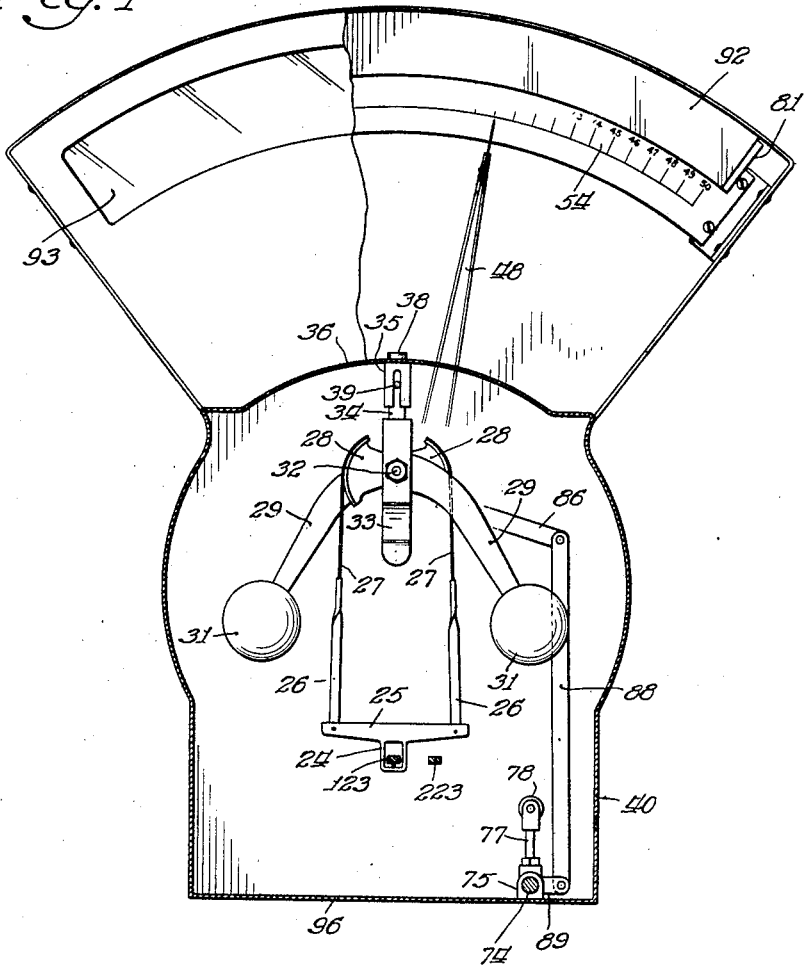
Figure 1 is a partial, vertical cross-section and partial elevation of the upright portion of the new scale on line 1—1 of Figure 3.

Referring first to Figure 3, it will be noted that the scale has the usual, forwardly-extending, load-receiving platform 21 above a portion of the scale housing 22 which accommodates the lever-mechanism of any usual or well-known character on which the platform is mounted, such lever-structure having a rearwardly-projecting nose-piece 23 which has a lateral portion 123 (Figure 6) extended through, and bearing downwardly on, a loop 24 (Figure 1) forming a middle depending part of a horizontal equalizer-bar 25 (Figures 1, 3 and 6), the opposite ends of which by members 26, 26 are united with the lower ends of a pair of flat, metal bands 27, 27 the other ends of which are fastened to a pair of oppositely-arranged sectors 28, 28 with outer eccentric surfaces on which the bands bear.

These companion sectors, each of which has an arm 29 carrying a weight 31 at its lower end so that they constitute pendulums, are mounted to rock in opposite directions on a shaft 32 supported in a frame 33 having at its top an upstanding, cylindrical stud 34 occupying a like-shaped cavity in a fixed bearing 35 depending from a wall 36 of the housing or casing 37 equipped with an externally-accessible adjustment-screw 38, the lower end of which is situated in a screw-threaded aperture in the top of the part 34, the latter having a vertically-arranged pin-and-slot connection 39 with the bearing 35.

Thus frame 33 is subject to vertical adjustment but it is prevented from turning by the pin-and-slot device.

Obviously, when a load on the platform causes the descent of the nose-piece 23, such movement rocks the two pendulums upwardly and outwardly in opposite directions equal amounts just sufficient to counterbalance the load, and, as soon as the load is removed from the platform, the pendulums, under their own weight, return automatically to their original lower positions.

The rear end portion or arm 223 of nose-piece 23 occupies a loop 41 on the lower end of a flat, metallic band or ribbon 42 extending over and around the upper surface of a drum 43 mounted for oscillation, as the case may be, on or with, a shaft 44 in a frame 45 secured to the back-wall 46 of the casing 37, the intermediate portion of such band in engagement with the cylindrical face of the drum being fixedly secured thereto in any approved manner at 47.

A long pointer or index 48, as shown in Figure 3, has its lower terminal portion fastened to the side of such drum at 49 so that the pointer rocks or turns with the drum.

The other depending end of band 42 has a first or original, round counterweight 51 secured thereto at 52, such weight having a top or upper concentric, conical surface 53.

This weight 51 is just enough in amount to counterbalance all of the movable or operative parts of the scale when there is no load occupying the platform and at which time the pointer or index is at the zero graduation of a first, stationary chart 54 referred to hereinafter and which in this particular embodiment of the invention is graduated from zero to and including 50 pounds.

This scale, however, is also capable of weighing loads from 50 pounds to and including 100 pounds, but it requires manual modification to do this and the parts and their functions capable of producing this result will now be set forth.

In order to weigh these loads of higher amounts, the first 50 pounds of the load must be counterbalanced and then the excess over 50 pounds will be accurately weighed by the same compound-pendulum mechanism.

This neutralization or balancing of such first 50 pounds is brought about by increasing the counterbalancing-weight 51 by adding thereto an auxiliary or supplemental weight 55 of the proper or exact amount.

Weight 55 is of the general external form presented in Figures 2, 4, 5 and 6 and has a hollow interior with a top conical surface 56 of the same slope as, and complementary to, surface 53 of weight 51, whereby the latter can carry the outer weight 55 in the manner shown in Figure 5, this assistant or companion weight 55 when operative constituting a rider on the inner smaller weight 51.

When the scale is set to weigh loads of 50 pounds or under, such additional weight 55 is inoperative and is held inactive in the elevated position depicted in Figure 4, the band 42 passing down through the central top opening in weight 55.

When, however, the scale is to be used for weighing loads of 50 to 100 pounds, then the extra weight 55 is lowered, as portrayed in Figure 5, and rests on the inner weight so that the two in effect constitute a single weight counterbalancing not only the movable parts of the appliance but also the first 50 pounds of the greater load.

In order to apply such ancillary or complementary weight 55 to, and to remove it from, the companion, constantly-operative, smaller weight 51, as occasion may require, the following coacting mechanical instrumentalities are employed.

In a stationary-frame 61, secured fixedly against the inner face of one of the side-walls 40 of the housing, a pair of upper and lower, equal-length links 62, 63, in the form of frames, are fulcrumed at their ends at 64 and 65, respectively, their other ends being hinged at 66 and 67 to an end portion of a frame-like arm 68 having at its free end a seat 69 with a central aperture 71 therethrough larger than the cross-section of weight 51 and also having conical side and end walls 72, 72 with a slope or inclination corresponding to that of the companion sloping surfaces 73, 73 of the lower portion of weight 55.

In order to raise and to lower such pan or saucer-like seat-member to lift or lower the secondary weight 55, to render it inoperative or operative, respectively, suitable mechanical means about to be described are employed, but, in passing, it is to be noticed that because of the double-link, parallel-motion mounting for the arm 68, the weight-seat will always be maintained in its horizontal position regardless of its elevation.

To actuate such arm 68 and its seat, a rock-shaft 74 in the lower part of the scale-casing is mounted to turn in suitable bearings 75 of which only one is shown, such shaft protruding from the encasing housing at the front of the latter where it is fitted with an operating-handle 76.

Fixed on such shaft, so as to rock therewith, is an adjustable arm 77 equipped at its free end with a roller 78 designed to bear against and roll under the bottom wall 79 of the arm 68 which, as shown, is in the form of a frame, thus, when arm 77 is in its upright position, as illustrated in Figure 4, member 68 and its seat or saddle 69 are in their highest position of travel and they support weight 55 at its greatest-elevated, inoperative position and in such a manner that the companion weight 51 can function without interference, and, when such arm 77, element 68 and its seat are in their lowermost positions, as portrayed in Figure 5, weight 55 is mounted on and carried by weight 51 whereby they unitedly or conjointly function as a single counterbalancing-weight.

Obviously when the two weights 51, 55 are both operative, the 0–50 pounds chart 54 is inappropriate to depict the load of more than 50 pounds resting on the scale-platform 21, and, accordingly, when shaft 74 is manually turned by its handle to render the two weights operative, means are also provided for automatically rendering another suitable chart active and at the same time making the first chart 54 inactive.

To this end a second movable chart 81 (Figures 2 and 3) displaying graduations from 50 pounds to and including 100 pounds, is employed, such arcuate-shaped chart being mounted on the upper ends of a number of arms 82 diverging upwardly from a central bar 83 slidable vertically in a pair of bearings 84 and 85 carried on the front of the housing rear-wall, such bar at its lower end being pivoted or hinged to one end of a lever 86 fulcrumed at 87 and hinged at its other end to the upper portion of a link 88 pivotally connected at its lower end to the end of a second arm fixed to and turnable with shaft 74.

When shaft 74 and arm 89 are in the positions presented in Figure 4, under which conditions the single weight 51 only functions, chart 81 is in its up position out of sight behind a stationary, curved shield 92, allowing the stationary scale 54 only to be seen through the window 93 of the casing.

On the other hand, when the two companion weights are both operative as a single weight, as shown in Figure 5, then arm 89 is upright and the second chart 81 is down covering, wholly or in part, chart 54 making the latter inactive and the former operative.

As depicted in Figure 4, the extent of turning of shaft 74 and the parts mounted thereon in one direction is limited by an adjustable, screw-threaded stop in the form of a bolt 94 carried by a bracket 95 mounted on the side-wall 40 of the casing, the roller 78 engaging the head of such bolt, the turning of the shaft in the opposite direction being restricted by the same roller contacting the floor 96 of the housing as illustrated in Figure 5.

From the foregoing, it should be apparent that when a load of 50 pounds or less is to be weighed, handle 76 is turned to rock shaft 74 so that the parts associated therewith will occupy the positions and relations set forth in Figures 1 and 4, making weight 51 alone then operative to counterbalance the moving parts of the mechanism, the weight of the load being balanced automatically by the compound-pendulum mechanism and the load weight being shown by the position of the index or pointer 48 with relation to the graduations of the then active chart 54.

When, however, a load in excess of 50 pounds is to be weighed, shaft 74 is rocked by its handle into a position to bring the several elements into the interrelations presented in Figures 2, 3 and 5, the second scale 81 then being active and the combined weights 51 and 55 operative to counterbalance not only the movable mechanical parts but also the first 50 pounds of the load, the compound-pendulum mechanism balancing that portion of the load in excess of 50 pounds, the total load, however, being shown by the index on the second chart.

If a load of less than 50 pounds were placed on the scale-platform with the parts in the positions set forth in the immediately preceding paragraph, no movement of the index or pointer would take place, its movement being effected only by the weight of a load greater than 50 pounds.

As is shown, chart 81 has its graduations and figures such that they include the first 50 pounds of the load balanced by such second weight 55.

Instead of using two charts made operative individually in the manner hereinabove set forth, several other comparable means and methods may be employed, only one of which is described below and shown in Figures 7, 8, 9 and 10, and, in this case, no means are employed for moving one of the charts but rather the two charts are always in view through the window with only the active one illuminated.

In this instance, each of the two charts 154 and 181 is at least translucent and forms a portion, or the whole, of the front wall of its individual chamber 101 and 102, respectively, each supplied with one or more electric-lights 103 and 104 of any usual or suitable form and shape.

In this case, shaft 74 is fitted with an arm 105 to operate a spring-controlled electric-switch 106 which closes the electric-circuit 107 of the one, or of the other, electric-light as the case requires.

Thus only the one chart is illuminated corresponding to whether the one weight or the two weights are operative, and, when the shaft is turned to modify such weight condition, the other chart is illuminated and the previously-lighted one is rendered dark by the absence of electric-current to its lamp-bulb.

In its broader aspect, this invention can be used to advantage without changing the amount of the counterbalancing-weight, using merely the plurality of interchangeable charts with one only active at a time; for example, under some conditions, it is desirable to use the weighing-scale solely as such with a corresponding first chart or to use the scale as a counter of a plurality of members of equal weight, say for instance a mass or body of screws.

In that case, the one chart would be graduated in weights and the other chart graduated in quantities.

Such a construction merely omits from either of those described above, the secondary or auxiliary counterbalancing-weight and its operative means, or either of the hereinabove specified convertible scales may have its two charts with one graduated for weights and the other for quantities, or both graduated for quantities.

Those acquainted with this art will readily understand that the invention as defined by the appended claims is not necessarily limited and restricted to the precise and exact structural details herein set forth and that modifications may be resorted to without departure from the heart and essence of the invention and without the loss or sacrifice of any of its material or substantial advantages.

We claim:

In a convertible multiple-capacity weighing-scale having a support for the load to be weighed, means including a first-weight to balance the movable parts of the scale, a second counterbalancing-weight adapted to function in addition to said first-weight to increase the capacity of the scale, weight-means automatically balancing the load on said support, means to indicate the weight of the load on said support, and manually-operative means to render said second-weight operative and inoperative to modify the capacity of the scale, including a carrier for said second-weight-parallel-motion mechanism for said carrier including a pair of equal-length links having fixed vertically-spaced fulcrums and also hinged to said carrier, and a manually-rockable shaft and connecting means therefor to actuate said carrier, the novel combination of features being that said second-weight carrier comprises an arm having a substantially-horizontal portion with an upstanding vertical portion at one of its ends, the horizontal portion of said arm being equipped with a pan adapted to receive and to support said second-weight in an upper inoperative position or to be free from said second-weight in a lower position of said pan and in which said second-weight is operative and carried by said first-weight, that said parallel-motion mechanism links are hinged to the upstanding vertical portion of said arm, that the horizontal portion of said arm extends below and beyond the fulcrums of said links, that said pan on said arm is on the side of said link-fulcrums opposite to that in which said links extend from such fulcrums, that the interior of said pan is tapered vertically in the direction of lateral travel of the pan in its vertical parallel-motion movement, that the bottom portion of said second-weight is correspondingly vertically tapered to cooperate with said pan, that said second-weight is chambered to receive said first-weight inside of it, that the horizontal dimension of said chamber is greater than that of said first-weight in the direction of the length of said arm, that the top of said second-weight and the top wall of said chamber are tapered to co-act with one another, and that said connecting-means includes an arm carried by said shaft and a roller on said arm coacting with the underside of said pan-carrying arm to raise and to lower such arm and its pan.

ANDREW G. BROWN.
FELIX JANSEY.